Oct. 11, 1938.  F. D. SCHMIEDEMANN  2,132,652
RESERVATIONS CABINET AND DAILY REMINDER
Filed July 26, 1937  2 Sheets-Sheet 1
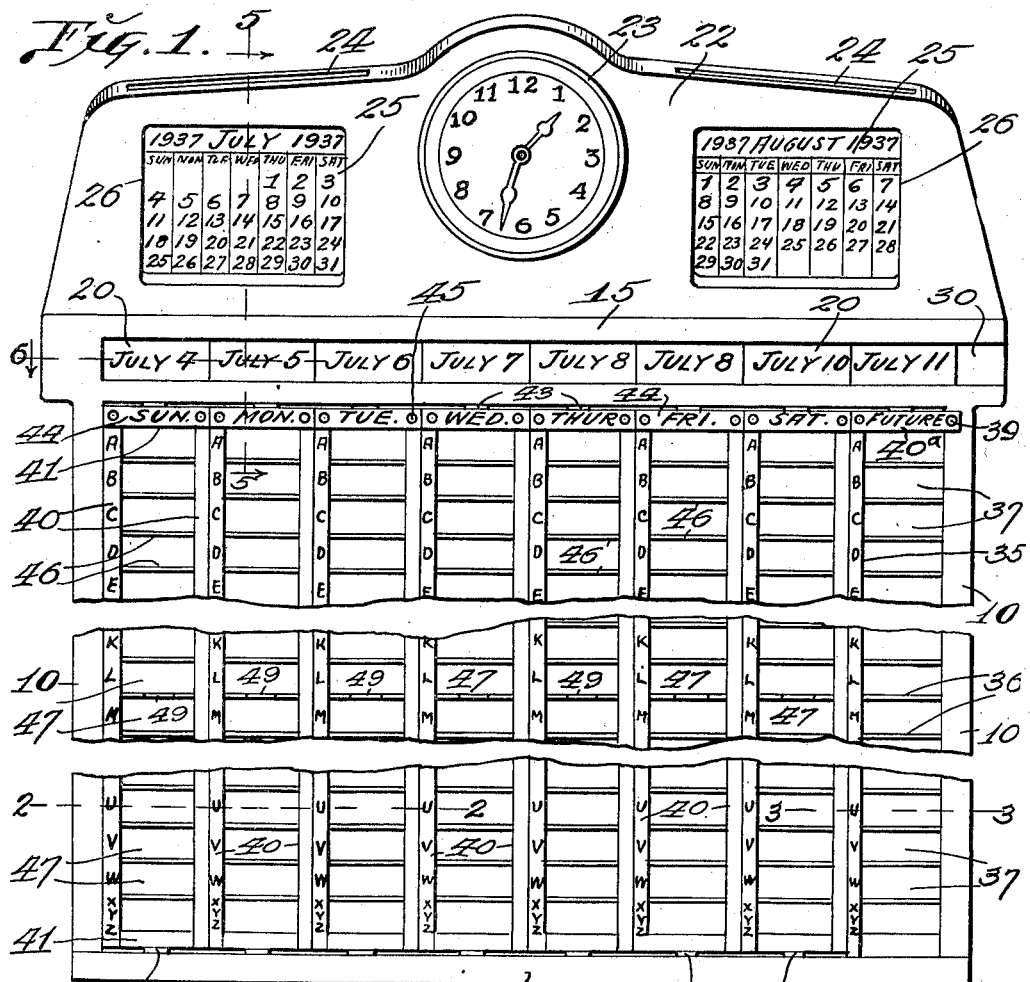
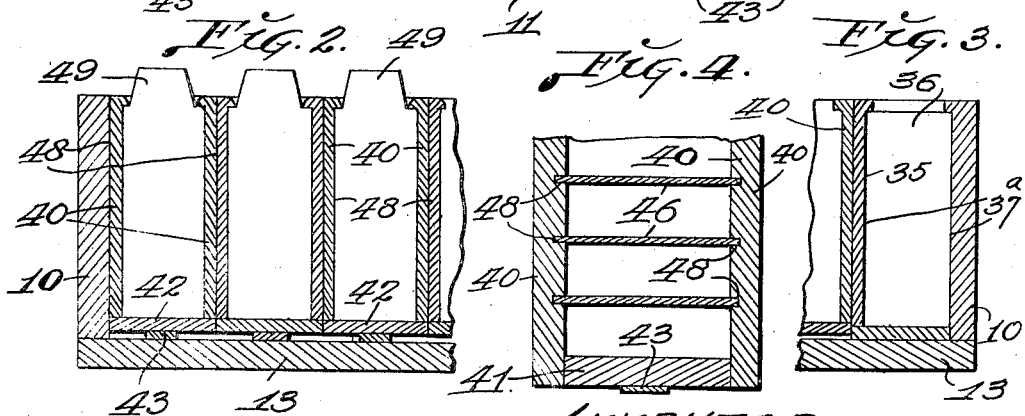
INVENTOR,
FRANKLIN D. SCHMIEDEMANN
BY Martin P. Smith ATTY.

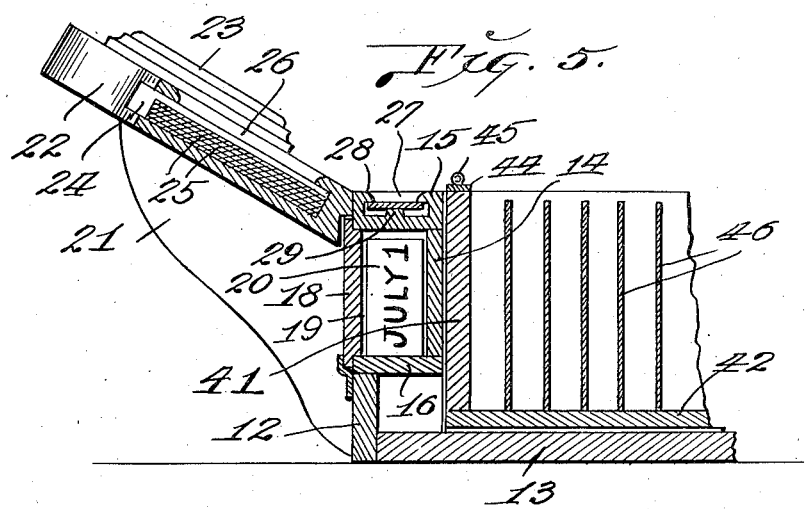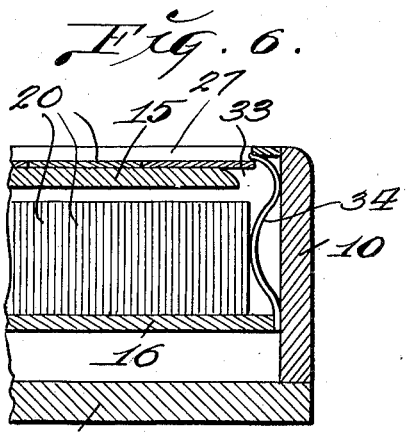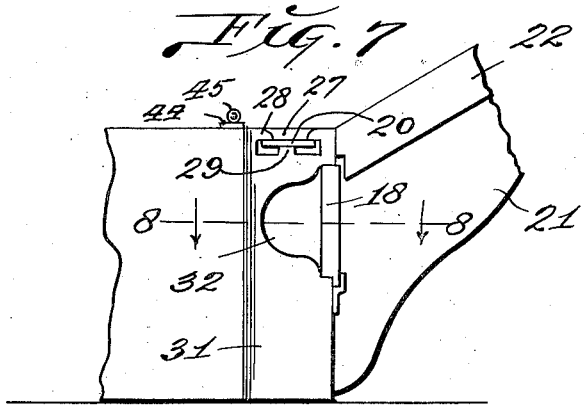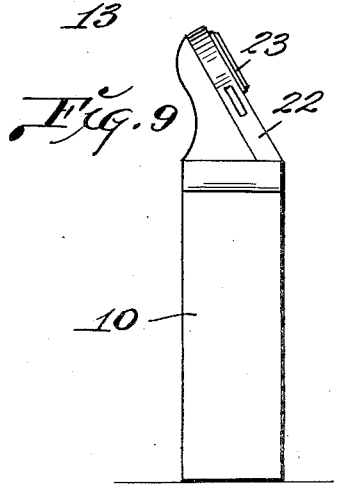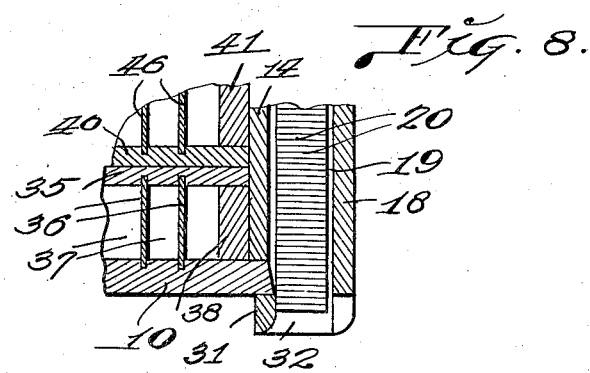

Patented Oct. 11, 1938

2,132,652

UNITED STATES PATENT OFFICE 2,132,652

RESERVATIONS CABINET AND DAILY REMINDER

Franklin D. Schmiedemann, Los Angeles, Calif.

Application July 26, 1937, Serial No. 155,722

8 Claims. (Cl. 129—16)

My invention relates to a reservations cabinet and daily reminder, and while the construction herein described is particularly designed for the convenient handling of reservations made by patrons of hotels, railroad trains, passenger vessels, airplanes, theatres and the like, the cabinet may also be conveniently used by banks, trust companies, mercantile establishments and the like, for keeping accurate record and bring to attention at the proper time, the expiration of notes, also the dates of interest payments and the dates on which accounts are due and payable.

The principal object of my invention is, to provide a cabinet of the character referred to that is relatively simple in construction, very compact and which effects a material saving of time and labor in the transactions incident to the taking care of hotel reservations, or in fact any transaction that is arranged for, and which is to be brought to the attention of the user of the cabinet on a specified date or hour.

A further object of my invention is, to provide a reservations cabinet or the like, that is constructed and equipped so that it may function as a perpetual calendar for taking care of future engagements, or matters that have been arranged for, and which are to be brought to attention at a specified time.

With the foregoing and other objects in view my invention consists in certain novel features of construction and arrangements of parts that will be hereinafter more fully described and claimed and illustrated in the accompanying drawings in which:

Fig. 1 is a top plan view of a reservations cabinet constructed in accordance with my invention.

Fig. 2 is a vertical section taken on the line 2—2 of Fig. 1.

Fig. 3 is a vertical section taken on the line 3—3 of Fig. 1.

Fig. 4 is a horizontal section of a portion of one of the interchangeable trays used in the cabinet.

Fig. 5 is a vertical section taken on the line 5—5 of Fig. 1.

Fig. 6 is a vertical section taken on the line 6—6 of Fig. 1.

Fig. 7 is an elevational view of the rear righthand portion of the cabinet.

Fig. 8 is a horizontal section taken on the line 8—8 of Fig. 7.

Fig. 9 is an elevational view of the form of cabinet that is adapted to be used in an upright or vertical position.

The cabinet, as illustrated, is in the form of an open-topped box or receptacle that comprises side walls 10, front wall 11, rear wall 12 and a bottom 13, and said walls and bottom may be formed of wood, metal, Bakelite or other suitable material and the external faces thereof decorated as desired.

Secured within the rear portion of the box or cabinet, parallel with and spaced a short distance in front of rear wall 12, is a partition 14 that extends from one side wall to the other and supported by and extending rearwardly from the top of this partition is a panel 15.

The height of rear wall 12 is somewhat less than the height of the side and front walls of the cabinet, and extending between the upper edge of the rear wall 12 and the partition 14, is a horizontally disposed wall or partition 16.

Arranged for longitudinal sliding movement between the rear portion of panel 15 and partition 16, is a panel 18 that extends the full width of the cabinet.

The compartment or chamber 19 between the panel 15 partitions 16 and 14, and sliding panel 18 functions as a storage chamber for rectangular sections 20 of Celluloid or the like, that bear the names of the months and the numbers of the days of the month. There are 365 of those members 20, one for each day in the year.

Secured to the rear face of rear wall 12, and projecting upwardly and rearwardly are brackets 21 that support an inclined panel 22, the lower forward edge of which is secured to the rear edge of panel 15.

Mounted on the central portion of this panel 22 is an electric clock 23, and formed in the panel to the sides of the clock are substantially rectangular pockets 24 for the reception of calendar cards 25, each card bearing on its face the name of a month and a calendar arrangement of the days of the month. An opening 26 is formed in the upper portion of the panel 22 above each pocket 24, thus enabling the calendar cards to be readily observed.

In the use of the cabinet, the calendar card corresponding with the present month appears through the lefthand one of the openings 26, and the calendar card for the succeeding month appears through the righthand one of said openings.

On the first of each month, the upper one of the cards in the righthand pocket is transferred to the top of the cards in the lefthand one of the pockets, and thus the user of the device has constantly in view a calendar for the present and succeeding months.

Panel 15 is provided with a longitudinally disposed channel 27, the lower portion of which is slightly wider than the upper portion, thus providing along the sides of said channel, flanges 28 that project toward each other, and which serve to retain in said channels, the individual date-bearing members 20 as they slide from the righthand end to the lefthand end thereof.

In order to decrease the friction between the sliding members 20 and the bottom of the channel, a narrow longitudinally disposed rib 29 is formed on the bottom of the channel 27 and the members 20 rest on this rib as they slide through channel 27.

The righthand end of channel 27 is open at the corresponding end of panel 15, as designated by 30, in order to permit the periodic insertion of the individual members 20, as the latter are withdrawn from the righthand end of compartment 19.

Positioned on the outer face of the righthand side wall 10, immediately below the corresponding end of panel 15, is a vertically disposed block 31, that functions as a side wall for the corresponding end of chamber 19, and formed in the upper portion of said block is an opening 32, which permits the thumb or finger to be placed on the outer one of the members 20, in order to remove same rearwardly past the righthand end of the slide 18, and after such removal, the member is inserted in the open righthand end 30 of the channel 27, so as to engage the righthand end of the member 20 that was previously inserted in said channel. Thus the ends of the members 20 within the channel 27 abut each other, and lateral pressure applied to the righthand one of said members in the channel will move all of said members toward the lefthand so as to properly position the date-bearing members 20 directly above the slip compartments that occupy the greater portion of the cabinet and which are hereinafter more fully described.

At the lefthand end of the panel 15 in which channel 27 is formed, the bottom of said panel is cut away to form an opening 33 that communicates with the upper portion of the lefthand end of the chamber 19, and positioned against the inner face of the adjacent side wall 10, directly opposite this opening 33 and extending downwardly to the partition 16 is a spring 34, having an inwardly bowed intermediate portion.

As a result of the arrangement just described, the lefthand one of the members 20 in the channel 27 when moved toward the lefthand will, as a result of its engagement with spring 34, bend and move downwardly through the opening 33 and the bowed intermediate portion of said spring will force said member against the end one of the members 20 that occupy the compartment 19. (See Fig. 6.) This transfer of the members 16 from the channel 27 to the compartment 19 takes place whenever the series of members 20 that occupy said channel are moved the length of one member toward the lefthand through the channel.

Secured within the box or cabinet adjacent and parallel with the righthand one of the side walls 10, is a partition 35 that extends from the front wall 11 to the partition 14 and panel 15; and arranged between this partition and adjacent righthand wall 10, are vertically disposed partitions 36 spaced equi-distant apart thereby forming vertically disposed pockets 37 for the reception of narrow cards or slips of cardboard or heavy paper on which is written data relating to future reservations; that is, reservations that are taken for dates in advance of a predetermined number of days, for instance, the seven days constituting a week.

Arranged between the partition 35 and adjacent side wall 10, immediately adjacent the partition 14, is a filler wall 38, and positioned on top thereof and held thereon by round-headed tacks 39 is a card or thin strip of celluloid or the like 40a, bearing the word "Futures", thus indicating that all data relating to future reservations and engagements are to be placed in the pockets 37.

The side edges of the thin partitions 36 occupy vertically disposed grooves 37a that are formed in the side faces of the partition 35 and the righthand side wall 10, and these grooves terminate just below the upper edges of said partition and side wall, as illustrated in Fig. 3, and thus the partitions 36 are prevented from dropping out of their proper positions in the event that cabinet is turned upside down.

Removably arranged within the box or cabinet between the partition 35 and the lefthand side wall 10, is a series of narrow boxes that are identical in construction and each box comprises a pair of parallel side walls 40, front and rear walls 41 and a bottom 42.

In order to reduce friction and to permit the boxes just described to move freely while being shifted from one position to the other, thin straps 43 of metal are positioned on the outer faces of the end walls 41 and on the under sides of the bottoms 42.

Where the cabinet is constructed for taking care of hotel reservations and for booking passengers on trains, passengers on ships, airplanes and the like, there are seven of the boxes used in the cabinet, one for each day in the week, and secured on the upper face of the upper end wall 41 over each box, is a strip 44 of Celluloid, metal or the like; and printed thereupon, is the name of one of the days of the week. The printed slips 44 are preferably retained on the end walls of the boxes by round-headed tacks 45 and the pairs of tacks used in securing the strips to the boxes are preferably distinctly colored, in order to minimize the possibility of errors in inserting reservations slips in the compartments within the boxes.

Arranged between the side walls 40 of each box is a series of vertically disposed partitions 46 spaced equi-distant apart, said partitions being formed of thin sheet metal, Celluloid or the like. These partitions divide the space within each box into a series of small compartments 47, that are adapted to receive the slips of cardboard or heavy paper upon which is written data relating to the reservations. Each box contains approximately 25 compartments, one for each letter of the alphabet, and appearing on the upper edge of the lefthand side wall of each box directly opposite the compartments, are the letters of the alphabet.

To save space, one compartment may be provided for the last three letters of the alphabet.

The side edges of the thin partitions 46 occupy vertically disposed grooves 48 that are formed in the inner faces of the side walls of the box, and which grooves do not extend all the way to the tops of said side walls. Thus the partitions are retained in the boxes in the event that the latter are turned upside down. (See Figs. 2 and 4.)

In order to provide handles to enable the boxes to be readily lifted from the cabinet, one partition in each box midway between its ends is extended upwardly a short distance, to form an ear or tab

49 that may be readily grasped between the thumb and finger.

The length of the strips 20 that bear the names and numbers of the days of the months is equal to the width of the boxes containing the compartments 47, and thus when the cabinet is made ready for use, one of the members 20 is positioned directly above one of the boxes and the boxes are arranged so that the days of the week appearing on the strips 44 that are positioned on the upper ends of the boxes correspond with, and are disposed directly below the days of the month that appear on those members 20 that are exposed in channel 27.

Assuming that the cabinet is used for taking care of reservations in hotels, and a patron bearing the name of Brown desires to make a reservation for July 10, the patron communicates with the hotel and the clerk or person in charge of reservations makes out a slip bearing the patron's name and other data relating to the reservation, and places the same in the compartment 47 designated by the initial B on the box that is position in the cabinet, directly below the member 20 bearing the date July 10.

At the close of each day's business, the clerk or person in charge of the cabinet removes the righthand one of the boxes having the slip receiving compartments 47, and after moving the rest of the boxes toward the lefthand to create a space equal to the width of one box immediately to the left of partition 35, inserts the removed box in such space, and at the same time exerts pressure on the righthand one of the exposed members 20 in channel 27 and moves the same toward the lefthand, thereby shifting the positions of all of the exposed members 20 the distance of one member, so as to bring the properly marked members 20 into position immediately above the boxes marked with the days of the week. As the members 20 are thus shifted toward the lefthand the distance of one member, the member at the lefthand end of the exposed series of members will strike against spring 34, and being formed of Celluloid or like flexible material, said member will bend downwardly and finally pass into position between the end of the series of members within the compartment 19 and spring 34.

The positions of the members 20 in their passage through the compartment 19 do not change, so that said members are in proper sequence as they reach the righthand side of the cabinet.

To replace the member 20 that has been transferred to the compartment 19, the operator places the thumb or finger in the opening 32 in block 31, to engage the righthand one of the series of members 20 in compartment 19 and withdraws said member and places the same in the righthand end of channel 27, and such procedure positions the members in proper sequence in the channel.

At the close or beginning of each day's business, the clerk or person in charge of the cabinet runs through the reservation slips contained in the compartments 37 having the heading "Futures" and transfers those slips that bear reservations made for the date taken care of by the next adjacent movable box, and which latter eventually arrives at the lefthand end of the box and which position corresponds to the reservation date.

When one of the movable boxes is transferred from the lefthand side of the cabinet to the righthand side thereof, all reservations slips will have been removed from the compartments 47.

The form of cabinet illustrated in Figs. 1 to 8 inclusive, is designed to occupy a horizontal position upon a counter, desk or the like, and the form illustrated in Fig. 9 is adapted to occupy a vertical position on a suitable support.

Thus it will be seen that I have provided a reservations cabinet and daily reminder that is relatively simple in construction, inexpensive of manufacture and very effective in performing the functions for which it is intended.

While the cabinet illustrated and described is particularly designed for handling reservations made by the patrons of hotels, passenger trains and vessels, airplanes, theatres and the like, the cabinet, without material change excepting as to the increasing of the number of boxes having compartments, may be economically and conveniently employed in banking institutions, trust companies, mercantile establishments and the like, for bringing to attention at the proper time, the dates of interest payments, expiration of notes and the dates on which full or partial payments of accounts are due.

It will be understood that minor changes in the size, form and construction of the various parts of my improved reservations cabinet and daily reminder may be made and substituted for those herein shown and described without departing from the spirit of my invention, the scope of which is set forth in the appended claims.

I claim as my invention:

1. In a reservation cabinet and daily reminder, the combination with a box-like container and a plurality of trays removably positioned within the said container, each tray having a series of compartments, said trays being distinctively marked, the compartments in each tray being distinctively marked, there being a series of compartments formed in the righthand portion of the container, the number of the last-mentioned compartments corresponding with the number of compartments in each tray, and there being a channel formed along the edge of said container at its upper end, of a series of date-bearing members arranged for sliding movement through said channel, the length of said date-bearing members being equal to the width of said trays so that when a row of said members is properly positioned in the channel, they occupy positions directly in line with the respective trays, there being a compartment in the container below said channel and one end of which channel communicates with said compartment to permit the date-bearing members to pass from said channel into said compartment.

2. In a reservation cabinet and daily reminder, the combination with a box-like container and a plurality of trays removably positioned within the said container, each tray having a series of compartments, said trays being distinctively marked, the compartments in each tray being distinctively marked, there being a series of compartments formed in the righthand portion of the container, the number of the last-mentioned compartments corresponding with the number of compartments in each tray, and there being a channel formed along the edge of said container at its upper end, of a series of date-bearing members arranged for sliding movement through said channel, the length of said date-bearing members being equal to the width of said trays so that when a row of said members is properly positioned in the channel, they occupy positions directly in line with the respective trays, there being a compartment in the container below said channel, one end of which channel communicates with said compartment to permit the date-bearing members to pass from said channel into said compartment and a spring for guiding the date-bearing members as they pass from the channel into said compartment and for yieldingly engaging said members within said compartment.

3. In a reservation cabinet and daily reminder, the combination with a box-like container and a plurality of interchangeable trays removably positioned within said container, each tray having a plurality of compartments, said trays being distinctively marked, the compartments in each tray being distinctively marked, and there being a channel formed along the edge of said container at its rear end, of a series of date-bearing members arranged end to end for sliding movement through said channel the length of said sliding date-bearing members corresponding to the width of said trays, there being a compartment in the container below said channel and a sliding panel forming the rear wall of said compartment, one end of which channel communicates with said last mentioned compartment and the other end of which last mentioned compartment is open to permit the removal of the date-bearing members from said channel.

4. In a reservation cabinet and daily reminder, the combination with a box-like container, a plurality of interchangeable trays removably positioned within said container, each tray having a plurality of compartments, said trays being distinctively marked, the compartments in each tray being distinctively marked, and there being a channel formed along the upper edge of said container at its rear end, and a series of date-bearing members arranged end to end for sliding movement through said channel, the length of which date-bearing members equals the width of said trays, there being a compartment in the container below said channel, one end of which channel communicates with said last mentioned compartment and the other end of said last mentioned compartment being open to permit the removal of the date-bearing members therefrom of resilient means located within said last mentioned compartment in the end thereof that communicates with said channel for guiding the date-bearing members as they pass from the channel into said last mentioned compartment.

5. In a reservation cabinet and daily reminder, the combination with a box-like container and a plurality of interchangeable trays removably positioned within said container, each tray having a plurality of compartments, said trays being distinctively marked, the compartments in each tray being distinctively marked, and there being a channel formed along the upper edge of said container at its rear end, of a series of date-bearing members arranged end to end for sliding movement through said channel, the length of which date-bearing members is equal to the width of said trays, there being a compartment in the container below said channel, one end of which channel communicates with said last mentioned compartment, and the other end of said last mentioned compartment being open to permit the removal of the date-bearing members from said channel, and a longitudinally disposed date-bearing member supporting rib projecting upwardly from the bottom of said channel.

6. In a reservation cabinet and daily reminder, the combination with a box-like container and a plurality of interchangeable trays removably positioned within said container, each tray having a plurality of compartments, said trays being distinctively marked, the compartments in each tray being distinctively marked, and there being a channel formed along the upper edge of said container at its rear end, of a series of date-bearing members arranged end to end for sliding movement through said channel, the length of which date-bearing members is equal to the width of said trays, there being a compartment in the container below said channel, one end of which channel communicates with said last mentioned compartment, and the other end of said last mentioned compartment being open to permit the removal of the date-bearing members from said channel, and a resilient member arranged within said last named compartment in the end adjacent the channel, which member communicates with the channel for guiding the date-bearing members from said channel into said last mentioned compartment and the bottom of said channel being provided with an upstanding longitudinally disposed rib for supporting the date-bearing members in said channel.

7. In a reservation cabinet and daily reminder, the combination with a box-like container and a plurality of interchangeable trays removably positioned within said container, each tray having a series of compartments, said trays being distinctively marked, and the compartments in each tray being distinctively marked, of a series of date-bearing members arranged end to end for sliding movement transversely of the container adjacent the upper ends of said trays, the length of said date-bearing members being equal to the width of the trays and the data borne by said date-bearing members bearing direct relation to the distinctive marking of the respective trays.

8. In a reservations cabinet and daily reminder, the combination with a box-like container, of a plurality of trays removably positioned within said container, each tray having a series of compartments, said trays being distinctively marked, the compartments in each tray being distinctively marked, a wall and plurality of partitions rigidly fixed in the container adjacent the right hand wall thereof so as to provide a row of permanent compartments in the right hand portion of the cabinet, the number of the last mentioned compartments corresponding with the number of compartments in each tray and there being a transverse channel formed in the top of the container directly to the rear of the trays therein, and a series of date-bearing panels arranged for sliding movement in said channel, the length of which date-bearing panels is equal to the width of the trays and the dates on the sliding panels bearing relation to the distinctive markings of said trays.

FRANKLIN D. SCHMIEDEMANN.